July 8, 1947.   J. R. RAFTER   2,423,727

THROTTLING DEVICE FOR TWO OPPOSED ELECTRICALLY CONTROLLED FORCES

Filed Nov. 13, 1945   2 Sheets-Sheet 1

INVENTOR
John Richard Rafter
BY Barlow & Barlow
ATTORNEYS

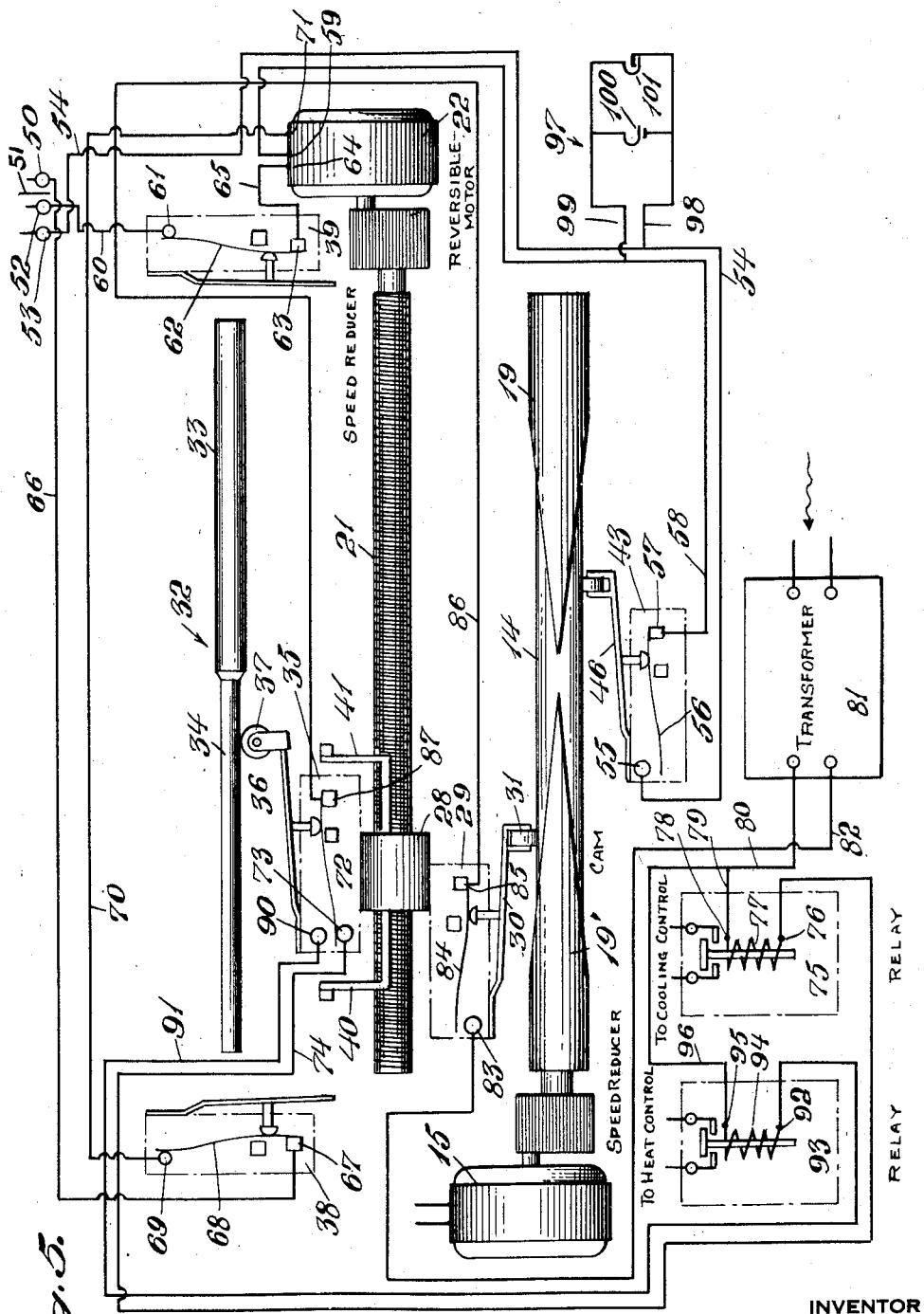

Patented July 8, 1947

2,423,727

UNITED STATES PATENT OFFICE 2,423,727

THROTTLING DEVICE FOR TWO OPPOSED ELECTRICALLY CONTROLLED FORCES

John Richard Rafter, Sharon, Mass., assignor to Providence Braid Company, a corporation of Rhode Island Application November 13, 1945, Serial No. 628,193

9 Claims. (Cl. 171—97)

This invention relates to a throttling device for two electrically opposed forces, such for instance as a heating source and a cold source or a humidifying source and a dehumidifying source or similar opposed equipment.

Heretofore in the control of two opposing forces, such as heating and cooling, it has been necessary with the apparatus which is in use to operate the heating source or the cooling source so that either one or the other was operating. In many instances, it is unnecessary, due to the natural condition, such for instance, as the temperature of the air, that one or the other of these be operating. For instance, should the room temperature be desired to be controlled and the outside temperature was nearly the same as the temperature in the room, considerable waste of energy would occur if one of the two forces is always operating as a neutral period could be utilized to advantage. However, the controls which are now in existence do not permit of such operation. Where cams are used, it is customary to use one portion of the cam during a revolution to operate one of the forces while the other force is operated during the remainder of the operation of the cam.

One of the objects of this invention is to provide an arrangement so that but one of the opposing forces is operated at a time, rather than alternation of operation between the two.

Another object of this invention is to provide the electrical control of the two forces so that each may be controlled in an off and on manner for a certain portion of the cycle of operation of the controlling unit.

Another object of this invention is to so provide individual electrical controls that dissimilar action of the two controls may be had, and thus a closer control of the ultimate result provided.

Another object of the invention is to provide a control so that should natural conditions supply the desired result in a certain area the power need not be utilized for alternately supplying the opposed forces to neutralize one another and thus arrive at the desired result.

Another object of this invention is to provide a control so that each of the forces may be progressively increased or decreased throughout the range of their operation.

Another object of this invention is to provide an adjustment through which the forces may be controlled.

Another object of this invention is to provide a bypass for such adjustment to speed up the operation, should extreme changes be required of the system which is to be controlled.

With these and other objects in view, the invention consists of certain novel features of construction, as will be more fully described and particularly pointed out in the appended claims.

In the accompanying drawings:

Fig. 5 is a diagrammatic view illustrating the wiring circuits of the apparatus.

Figure 1:
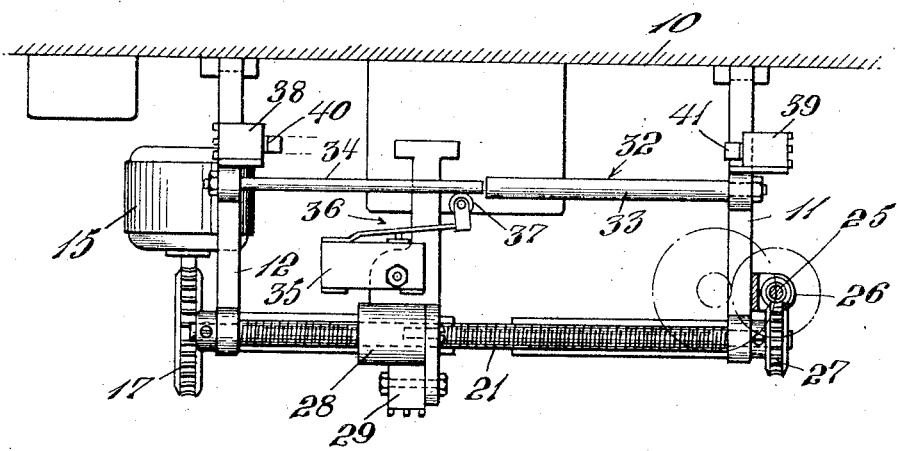
Fig. 1 is a plan view of the apparatus of this invention.
Figure 2:
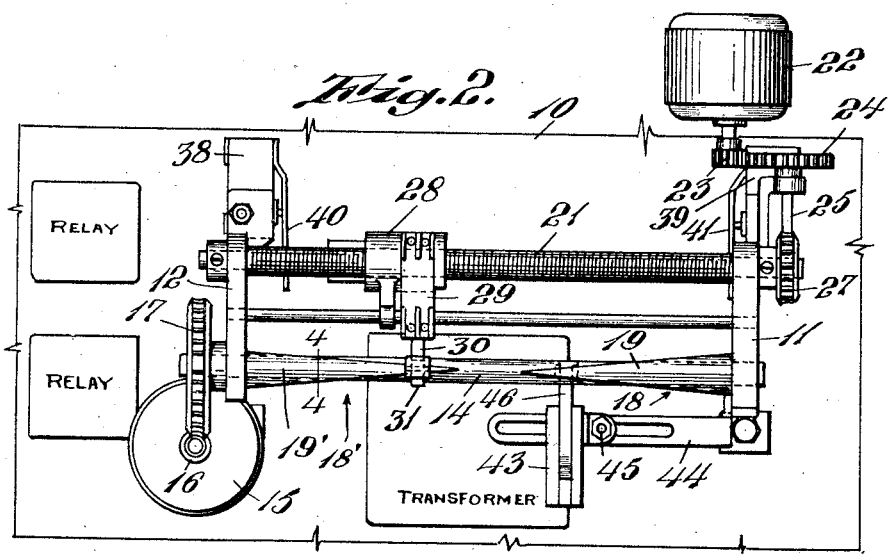
Fig. 2 is an elevation of the apparatus.
Figure 4:
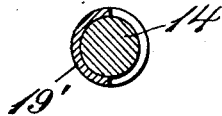
Fig. 4 is a section on substantially line 4—4 of Fig. 2.
Figure 3:
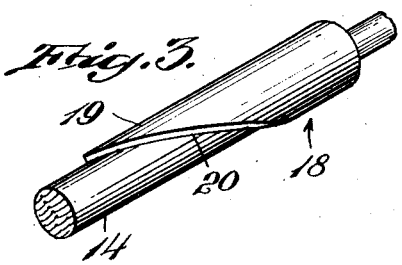
Fig. 3 is a perspective view of a portion of the constantly rotating shaft with a cam surface thereon.

In proceeding with this invention I provide a constantly driven shaft having raised cam-like surfaces thereon for engaging and operating an electric switch. The electric switch is carried by a reciprocating rider and may be moved in one direction or the other so as to cause the switch to be closed or opened varying amounts of time. The two cam surfaces may be different and one control one opposing force and the other control the other opposing force so that the controlled forces may respond according to the characteristics of the cam. The rider also carries another switch which will shift so as to place one of two circuits in connection with the switch carried by the rider dependent upon the position of the rider along the shaft upon which it operates, thus through substantially one part of the movement of the rider one force such as heat may be actuated while through another portion of the movement of the rider the other force such as cold may be actuated. The rider may be conveniently threaded and the shaft on which it operates threaded with the control through a reversible electric motor. This is a very convenient operation which will respond to a thermostat which may call for heating or call for cooling from either a heating unit or a cooling unit. An overall adjustable control for the operation of the rider may be provided which may be removed from the constantly operated cam shaft.

With reference to the drawings, which for illustrative purposes only is shown as applied to a temperature control, I have shown a mounting support or base 10 which has suitable frame work 11 and 12 providing bearings for two rotating shafts and two stationary shafts. There is a cam shaft 14 which is constantly driven by an electric motor 15 through the worm 16 and worm gear 17 on the end of the shaft 14. Shells 18 are slidable over the shaft 14 and are fixed thereto which provide raised surfaces 19 with edges 20. Two of these shells 18 and 18' are provided which progressively increase from an intermediate point on the shaft toward the ends thereof. The arrangement is such that when an arm engages the shaft, it will be raised by one of these surfaces for a period dependent upon the rotary angular distance or arc, at right angles to the axis of the shaft of such surface, while at the said intermediate point of the shaft the arm will not be raised because of the space between these cam surfaces.

A second shaft 21 is threaded throughout its length and is rotatably supported in the frames 11 and 12. This shaft is driven from a reversible electric motor 22 by the train of gearing 23, 24; shaft 25 with worm 26 thereon and worm gear 27. A rider 28 having a threaded bore is mounted on this shaft and may be moved axially of the shaft in one direction or the other dependent upon the direction of rotation of the motor 22. This motor is actuated in response to a thermostat in the room which is to be controlled as will be more fully explained in connection with the description of the wiring diagram of the apparatus. On this rider 28 a microswitch 29 is carried which has an operating arm 30 with a roll 31 at its end to roll upon the surface of the shaft 14 and on the cam surfaces 19 or 19' which are carried thereby. This microswitch functions in two circuits, one of which goes to the heating unit and the other of which goes to the cooling units as will be more fully described. When the roller 31 rides upon the cam surface 19', it will be raised for the length of time that the raised surface is in engagement with this roller and then it will drop back to the surface of the shaft 14 and travel therealong with the microswitch open.

The third shaft or rod is designated 32 and is carried by the frame work 11 and 12. It consists of a cylindrical rod of two diameters, the larger diameter being designated 33 and extending for the length of one cam 19 while the smaller diameter is designated 34 and extends for the length of the cam 19'. A second microswitch 35 of the single pole, double throw type, is carried by the rider and is provided with an arm 36 having a roller 37 which will rest upon either the portion 34 or the portion 33 of the rod or guide 32. When the roller is in engagement with the portion 34, its switch arm will be against one pole, whereas when in engagement with the portion 33 the switch arm will be engaged with the opposite pole. This places in circuit either the heating unit or the cooling unit, dependent upon the position of the switch arm in engagement with one pole or the other. In order to limit the operation of the reversing motor, I also utilize limit switches 38 at one end and 39 at the other end so that arms 40 and 41 will engage either one or the other of these limit switches as the rider approaches the end of its travel so as to disconnect the energizing circuit to the reversible motor 32 and stop the axial movement of the rider.

In order to further control the time of operation of the reversible motor for any portion of the cycle of operation of the constant speed shaft 14, I have inserted a switch 43 in the common line to the reversible motor 22 so that the switch may be moved along the arm 44 and held in place by the bolt 45, thus, its arm 46 may engage the raised surface 19 to close the switch for only that portion of rotation that the arm is in engagement with the surface 19 during the cycle of operation of the shaft 14.

In considering the operation of the apparatus (see Fig. 5), we will assume that the temperature of a room is desired to be controlled, that we have a source of heat so that hot air may be supplied in the room and a refrigerating source so that cold air may be supplied to the room, it being desired to maintain this room at a certain given temperature. A thermostat will have one pole or contact 50 which may be engaged by an arm 51 when the room is too hot and cooling is called for. There may also be a contact 52 which may be engaged by the arm 51 when the room is too cool and heating is called for. A common lead 53 may extend from the thermostat in order to complete the electric circuits from the contacts 50 and 52. This common terminal 53 is connected by a lead 54 through the contact 55 of the adjusting switch 43, the contact arm 56 of which is controlled by the operating arm 46 while the other end of this contact arm extends from the contact 57 through lead 58 to the common pole 59 of the reversing motor 22. The electric circuit from the contact 52 is through line 60 through limit switch 39 by connecting to the pole 61 thereof, thence through the arm 62 of the switch to the contact 63 and thence to the terminal 64 of the reversing motor 22 through lead 65. The reversing motor will so turn the second shaft 21 as to cause the rider to move to the right when heating is called for and the limit switch will limit the movement of this rider as above explained. If cooling is called for, the circuit is completed to the reversible motor from the contact 50 through the line 66 and through the limit switch 38 by connection at contact 67 thence through arm 68 to contact 69 and thence through line 70 to the connection 71 on the reversing motor 22. The reversing motor when operated through this last named circuit will cause the rider to move to the left as shown in Fig. 5 which would engage the limit switch 38 and limit the rider on this part of the shaft when cooling would be called for. In the position in which the rider is shown in Fig. 5 the arm 36 engages the small portion 34 of the rod 32 and the microswitch 35 will cause the contact arm 72 to be in engagement with the contact 73 and also through lead 74 will connect to the cooling control designated generally 75. This lead is to the terminal 76 of the relay coil 77 thereof and leaves this relay coil through contact 78 thence through line 79 and 80 to the transformer 81. From the other side of the transformer circuit is established through lead 82 to the contact 83 thence through contact arm 84 of the microswitch 29 and from contact 85 of this microswitch through line 86 to the contact 87 of the microswitch 35, which completes the circuit to the cooling control through both microswitches 29 and 35, both carried by the rider 28. The cooling unit will be in operation for the length of time that the arm 30 is on the raised portion 19' of the shaft 14. The reversible motor will be carrying the rider to the left as cooling is called for through such portion of the operation of the shaft 14 as is permitted by the control of microswitch 43. Thus, the duration of the operation of the cooling apparatus will be gradually increased until such time as the room arrives at the desired temperature when the thermostat will leave the contact 50.

If we now assume that the room has become too cool, then the thermostat arm will switch to contact 52 which will call for heating and the reversible motor will be operated so as to move the rider to the right. As this movement commences, the cooling will become less and less due to the location of the rider at a point where the arm 30 will engage the decreasing portion of cam 19' of the shaft 34. This will continue with less supplying of cool air until a point when the arm 30 of the microswitch 29 arrives at a point between the two cams 19 and 19' when neither heating nor cooling unit will operate. If heating is still further called for, then the rider is moved further to the right as it passes between the cams of the layout the arm 36 will engage the larger portion 33 of the shaft 32 and throw the double throw switch so that the arm 72 will engage the contact 90 of this switch and at the same time the arm 30 with its roller 31 will engage the cam surface 19 of the shaft 14 for such portion of the rotation of the cam as the high part of surface 19 is beneath the arm 30. In this case the circuit from the contact 90 is through the lead 91 to the terminal 92 of the heating unit 93 which connects in circuit the relay coil 94 and from terminal 95 thereof, through lead 96, the circuit is completed to the transformer 81. The return from the transformer 81 is through the circuit previously traversed which includes the lead 82, contact 83 of microswitch 29, arm 84 thereof, contact 85 and lead 86 to the microswitch 35, thence through contact 87 to arm 72 which is, in this instance, in engagement with the contact or pole 90 thereof.

In some instances it might be desirable to bypass the adjustably positioned microswitch 43 and to do this a thermostat 97 having contacts which are outside of the limits of the usual contacts is provided as shown in Fig. 5. This hookup is such that leads 98 and 99 extend from the leads 54 and 58 and these are bridged by a contact 100 if a certain height of temperature is attained while if the temperature drops the leads are bridged by a contact 101 each in response to movement of a bimetal member.

I claim:

1. A throttling device for two opposed electrically controlled forces comprising a constant speed shaft, switch actuating surfaces on said shaft, a threaded shaft, a rider actuated thereby to move longitudinally along said constant speed shaft, a switch carried by said rider to be actuated by said actuating surfaces, a pair of circuits both including said switch and means including a switch carried by said rider to complete one or the other of said pair of circuits dependent on the position of said rider along said threaded shaft.

2. A throttling device for two opposed electrically controlled forces, comprising a constantly rotating shaft, a pair of cams comprising relatively raised surfaces on said shaft increasing progressively in opposite directions from a point intermediate the ends of the shaft outwardly towards the ends, a second shaft, a rider thereon carrying a switch to engage said raised surfaces and be closed thereby for a length of time dependent upon the position of the rider relative to the constant speed shaft, and means to move the rider along said second shaft.

3. A throttling device for two opposed electrically controlled forces comprising a constantly rotating shaft, a pair of cams comprising relatively raised surfaces on said shaft increasing progressively in opposite directions from a point intermediate the ends of the shaft outwardly towards the ends, a second shaft, a rider thereon carrying a switch to engage said raised surfaces and be closed thereby for a length of time dependent upon the position of the rider relative to the constant speed shaft, and means to move the rider along said second shaft, a pair of circuits having a common portion including said switch and means to shift said switch from one circuit to the other as said rider moves said switch from one cam to the other.

4. A throttling device as set forth in claim 3 wherein said means includes a double throw switch carried by said rider.

5. A throttling device as set forth in claim 3 wherein said means includes a single pole double throw switch carried by said rider and a guide surface for actuating said switch.

6. A throttling device as set forth in claim 3 wherein said second shaft is threaded and a reversible motor rotates said shaft in either one direction or the other.

7. A throttling device as set forth in claim 3 wherein said second shaft is threaded and a reversible motor rotates said shaft in either one direction or the other and a switch actuated by one of said cam surfaces determines the length of time said motor shall operate.

8. A throttling device as set forth in claim 3 wherein said second shaft is threaded and a reversible motor rotates said shaft in either one direction or the other and means are provided to limit the length of movement of said rider in one direction or the other.

9. A throttling device for two opposed electrically controlled forces comprising a constant speed shaft, switch actuating surfaces on said shaft, a threaded shaft, a rider actuated thereby to move longitudinally along said constant speed shaft, a switch carried by said rider to be actuated by said actuating surfaces, a pair of circuits both including said switch, and a second switch actuating longitudinally extending surface and another switch carried by said rider having an arm to move along said second surface to complete one or the other of said pairs of circuits dependent upon the portion of the second surface said arm engages.

JOHN RICHARD RAFTER.

REFERENCES CITED

The following references are of record in the file of this patent:

UNITED STATES PATENTS

| Number | Name | Date |
| --- | --- | --- |
| 1,461,001 | Hartford | July 3, 1923 |